United States Patent [19]

Ulich et al.

[11] Patent Number: 5,109,349
[45] Date of Patent: Apr. 28, 1992

[54] ACTIVELY CONTROLLED SEGMENTED MIRROR

[75] Inventors: Bobby L. Ulich; Kent Pflibsen, both of Tucson, Ariz.

[73] Assignee: Kaman Aerospace Corporation, Bloomfield, Conn.

[21] Appl. No.: 468,617

[22] Filed: Jan. 23, 1990

[51] Int. Cl.$^5$ ............................................. G02B 5/10
[52] U.S. Cl. ................................. 364/525; 359/849; 359/851
[58] Field of Search .................... 364/525; 250/201.2, 250/201.3, 202; 324/207.24; 350/537, 600, 607, 612

[56] References Cited

U.S. PATENT DOCUMENTS

| | | | |
|---|---|---|---|
| 4,816,759 | 3/1989 | Ames et al. | 324/207.24 |
| 4,825,062 | 4/1988 | Rather et al. | 350/611 |
| 4,943,771 | 7/1990 | Fuschetto | 350/611 |

Primary Examiner—Joseph L. Dixon
Attorney, Agent, or Firm—Fishman, Dionne & Cantor

[57] ABSTRACT

A segmented mirror control system comprises an array of structural elements (e.g. mirrors) which can be actively positioned to maintain an accurate pre-determined overall shape. The present invention is "active" and so may be characterized as an Active Segmented Mirror Control "ASMC". The segments of a mirror or the reflecting panels, in for example, a radiotelescope, may be continually adjusted with ASMC to provide an accurate reflecting mirror of very large diameter even when disturbed by external forces. ASMC is a closed loop control system. That is, an array of sensors is first used to measure differential position errors. This data is then processed to determine position actuator commands. Finally, these commands are used to move the segments until the sensors are nulled and the desired shape is obtained.

19 Claims, 2 Drawing Sheets

ACTIVELY CONTROLLED SEGMENTED MIRROR

BACKGROUND OF THE INVENTION

This invention relates generally to the field of large aperture optical systems. More particularly, this invention relates to extendible large aperture mirror systems having a phased array of mirror segments and a method for controlling the same.

Large aperture optical systems are currently in use for remote sensing, communications and radiation beam transport. In addition to being operated in a receiving mode, a large telescope may also be used as a transmitting element, or beam director. In some applications, such as astronomy, large telescopes are used to make high resolution images of extremely faint objects. Such large telescopes are not restricted to just visible wavelength operation. On the ground, large diameter telescopes have been built for radio, infrared, and optical wavelengths, and in space telescopes are also used in the ultraviolet and x-ray regions of the electromagnetic spectrum.

At radio wavelengths, cassegrain antennas with apertures of up to 100 meters have been built. The primary mirror of a large radio telescope is always constructed of a multitude of panels or mirror segments. Each segment is manufactured to the correct shape to high accuracy before it is installed on the support. In the past, surveying instruments were used to accurately locate the reflecting panels typically while the antenna is pointed at the zenith. However, when the antenna is moved, the supporting structure deforms and disturbs the panel positions, thereby degrading the reflector accuracy and decreasing the antenna gain. These deformations lead to distorted wavefronts and degraded performance.

In view of the foregoing, there is a need for developing methods and apparatus by which the segments in a large mirror may be controlled to correct and compensate for optically distorted wavefronts. One such method and apparatus is disclosed in U.S. Pat. No. 4,825,062 which is assigned to the assignee hereof and fully incorporated herein by reference. U.S. Pat. No. 4,825,062 describes a mirror system which is also known by the acronym "PAMELA" and which stands for Phased Array Mirror Extendible Large Aperture. In PAMELA, subaperture tilt information is derived by sensing an incoming optical wavefront. That wavefront is then used as part of an adaptive optical system to compensate for aberrations both in the optical system itself and those due to external effects such as atmospheric turbulence.

The PAMELA system includes a plurality of optical mirror segments each having opposed front and rear surfaces. These surfaces are bounded by a plurality of side surfaces. The segments cooperatively receive and reflect the electromagnetic beam at the front surface of each segment. A plurality of displacement sensors generates signals indicative of the relative position of the front surface of the segments. A plurality of displacement actuators, each responsive to control signals, are connected to the rear surfaces of the segments. That is, each rear surface is connected at a corresponding number of points to displacement actuators which generate linear and angular segment movement relative to a segment axis substantially perpendicular to the segment front and rear surfaces that substantially correspond to a mean segment position approximating the desired ideal optical figure. An optical wavefront sensor receives a portion of an electromagnetic reference beam and provides signals indicative of its wavefront distortion relative to an ideal wavefront. A controller transmits these signals directly to each segment, wherein in-situ actuator control signals are generated to position the mirror segments so as to generate a conjugate phase reflected electromagnetic beam without the need for external wavefront reconstruction addressing the full plurality of mirror segments on a one-to-one basis.

While well suited for its intended function, the PAMELA system disclosed in U.S. Pat. No. 4,825,062 is not entirely satisfactory in its control of the typically thousands of mirror segments defining large aperture phased array mirror systems. Accordingly, there continues to be a need for improved methods and apparatus for precisely controlling the multiplicity of mirror segments in a large mirror in order to maintain an accurate overall shape in the absence of an optical reference beam.

SUMMARY OF THE INVENTION

The above-discussed and other problems and deficiencies of the prior art are overcome or alleviated by the segmented mirror control system of the present invention wherein an array of structural elements (e.g. mirrors) can be actively positioned to maintain an accurate pre-determined overall shape. Unlike the "adaptive" PAMELA system of the prior art, the present invention is "active" and so may be characterized as an Active Segmented Mirror Control (hereinafter referred to by the acronym "ASMC").

The segments of a mirror or the reflecting panels, in for example, a radiotelescope, may be continually adjusted with ASMC to provide an accurate reflecting mirror of very large diameter even when disturbed by external forces. These disturbances may be externally applied or they may be due to environmental changes in wind, temperature or orientation with respect to gravity.

ASMC is a closed loop control system. That is, an array of sensors is first used to measure differential position errors. This data is then processed to determine position actuator commands. Finally, these commands are used to move the segments until the sensors are nulled and the desired shape is obtained.

It will be appreciated that ASMC can be applied to any structure which has a set of physical points which are desired to be maintained in an accurate spatial relationship to one another. That is, the present invention may be used in conjunction with any structure in which it is desired to maintain an accurate structural "shape". Thus, while the following description of the present invention describes a segmented mirror as an example of one type of structure to which ASMC can be advantageously applied, this example in no way limits the range of applications of ASMC. Other structures such as large trusses, may also be used with ASMC. One example of a large truss is the proposed U.S. Space Station structure.

The above-discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

The present invention relates to an "active" optical system wherein a plurality of adjacent mirror segments are slaved together to form a "perfect" mirror using only local information. In accordance with the present invention, this local information is derived from two sources including:

(1) segment-to-segment edge piston errors, measured normal to the surface; and (2) differential tilt errors between adjacent segments.

Figure 1:
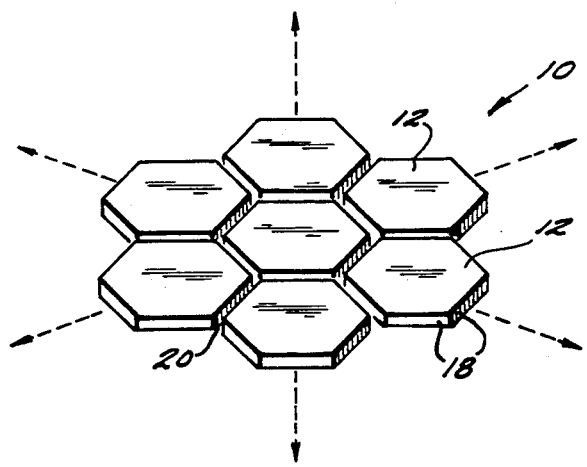
FIG. 1 is a perspective view of an array of mirror segments for use in the Active Segmented Mirror Control (ASMC) system of the present invention.
Figure 2:
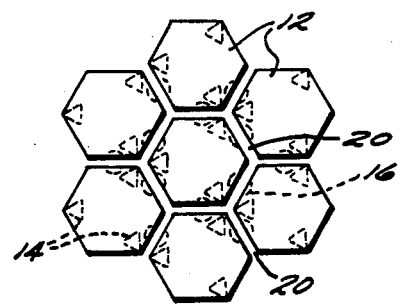
FIG. 2 is a top plan view of the mirror segments of FIG. 1.
Figure 3:
FIG. 3 is a side elevation view of the mirror segments of FIG. 1.

Referring now to FIGS. 1-3, a physical layout of ASMC as applied to a segmented array mirror 10 is shown. Although a flat mirror is shown in the FIGURES for simplicity, it will be appreciated that concave or convex shapes (in fact, any predetermined shape) can be accommodated by the method of the present invention. In the particular example shown in FIGS. 1-3, the segmented array mirror 10 is comprised of seven or more mirror segments 12 having a hexagonal shape. Each segment 12 is preferably supported by three equispaced actuators or pistons 14 such that length control of the three actuators 14 will produce vertical translation, tip and tilt movement to the corresponding segment 12. In addition, edge sensing elements 16 (e.g. sensors) are located along the side edges 18 of each segment 12 as shown in FIG. 2 to provide differential positioning information. These sensors 16 are comprised of a pair of elements located adjacent to each other on opposite sides of the gaps 20 between segments 12.

Segments 12, actuators 14 and edge sensing elements 16 are substantially similar or identical to the analogous components identified at 44, 54 and 60, respectively, in U.S. Pat. No. 4,825,062, the contents of which has been incorporated herein by reference. In addition, edge sensors 16 are described in even greater detail in U.S. Pat. No. 4,816,759, which is also assigned to the assignee hereof and fully incorporated herein by reference. Thus, both U.S. Pat. Nos. 4,825,062 and 4,816,759 should be referred to for additional detailed description of segments 12, actuators 14 and edge sensor 16.

Figure 4:
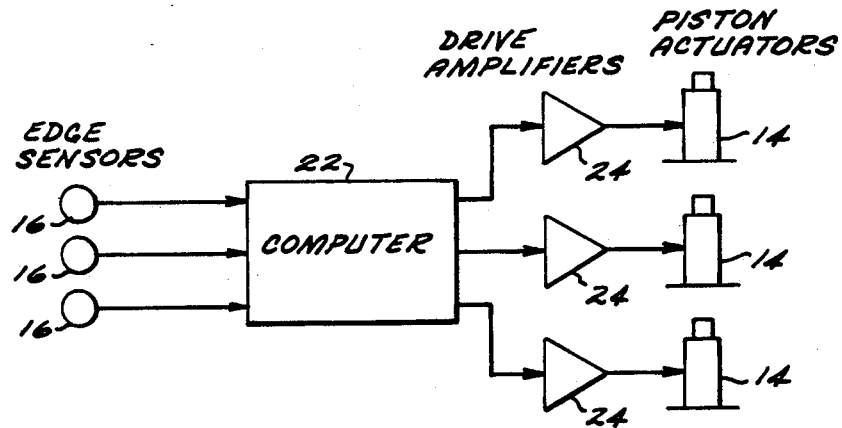
FIG. 4 is a schematic block diagram of the ASMC in accordance with the present invention.

Referring now to FIG. 4, a schematic block diagram of the ASMC system in accordance with the present invention is depicted. In general, and as shown in FIG. 4, the sensors 16 input signals to a computer 22 which outputs actuator commands to a plurality of electronic drive amplifiers 24 to position actuators 14 so that the sensor readings are all nulled.

There are three presently preferred control modes (e.g., Mode I, Mode II and Mode III) of operation for ASMC. In Mode I, each segment has associated with it a processor (computer) such as that shown in FIG. 4. Each sensor pair 16 is actually composed of an active side and a passive side. The active sides are alternately located around the six sides of the segment periphery. Thus, each segment 12 has three active sensor halves and three passive sensor halves. In the Mode I control method, each of the computers 22 reads only the three sensor outputs associated with the three active sensor halves located on its associated segment. In addition, each computer commands only those three actuators attached to that particular segment from which the three sensor readings were obtained. Thus, for N segments, ASMC is composed of N replicas of FIG. 4, all of the replicas being identical and independent for control using the Mode I method. Thus, the errors produced by disturbances will be reduced in an iterative fashion. A number of iterations will be required to achieve small errors, depending on the size of N. Thus, control Mode I has the advantage of utilizing massively parallel computation (all the processors perform the same arithmetic computations, except at the outer edge of the array (e.g. the outer ring) where some sensor data is not available). However, the disadvantage of Control Mode I is reduced temporal bandwidth of surface position control since a number of iterations are required to minimize the global surface error.

A second control mode (e.g. Control Mode II) is also possible with ASMC. In Mode II, sensor data from all segments is communicated to a central computer which effectively reconstructs the actual global surface by two dimensional integration. The computer then determines all actuator errors for the entire array, and commands all actuators in parallel to minimize the global surface error without iteration. Thus, Mode II has in principle a faster response time in correcting disturbances than Mode I (i.e., Mode II has larger temporal bandwidth). However, Mode II requires a computer capable of performing large matrix arithmetic and also an efficient communications network for feeding all sensor readings into the central computer. For very large numbers of segments N, the limited computational speed of a single central computer 10 could result in slower response time for Mode II than the total time required for a Mode I system to iterate and settle. Thus, depending upon N and the computer processing speed, either Mode I (local control) or Mode II (global control) could be faster and therefore preferred.

It will be appreciated that in commanding the movement of three actuators 14, a minimum of three sensor measurements must be made. That is, with no redundancy there must be at least one sensor measurement for the computer to command each piston actuator 14.

A third control mode (e.g. Control Mode III) is also possible with ASMC. In Mode III, sensor data from a segment and its neighboring segments are communicated to its processor. The segment computer then determines the three segment actuators. As with Control Mode I an iterative procedure will be necessary but incorporation of neighbor sensor information provides information which can be used to predict neighbor motion. This predictive capability allows the segment computer to move the segment in accordance with anticipated neighbor movement resulting in improved convergence speed. Thus, Mode III has the advantages of utilizing massively parallel computation thereby removing the need for a large computationally powerful central computer (all processors perform approximately the same arithmetic computations) and using predictive filtering to reduce the number of iterations needed to minimize the global surface error.

In Mode I, each segment processor computes the three actuator commands in accordance with the following equation:

$$A = M(S - S_o)$$

where
A is the 1×3 column vector of differential actuator commands;
M is the 3×3 conversion matrix;
S is the 1×3 column vector of differential sensor readings; and
$S_o$ is the 1×3 column vector of differential sensor readings to set the surface curvature.

The conversion matrix depends on the actuator and sensor mounting geometries. In Mode II, the global computer calculates the actuator commands in accordance with the following equation:

$$A = M(S - S_o)$$

where
A is the 1×3N column vector of differential actuator commands;
M is the 3N×3N conversion matrix;
S is the 1×3N column vector of differential sensor readings;
$S_o$ is the 1×3N column vector of differential sensor readings to set the surface curvature; and
N is the total number of segments.

The conversion matrix depends on the actuator and sensor mounting geometries.

In Mode III, each segment processor computes the three actuator commands in accordance with the following equation:

$$A = M(S - S_o)$$

where
A is the 1×3 column vector of differential actuator commands;
M is the 3×3 (J+1) conversion matrix;
S is the 1×3 (J+1) column vector of differential sensor readings;
$S_o$ is the 1×3 (J+1) column vector of differential sensor readings to set the surface curvature; and
J is the number of nearest neighbor segments considered in settling the segment (for contiguous neighbors J is at most 6 for the hexagonal segment geometry).

The conversion matrix depends on the actuator and sensor mounting geometries and on the relative weighing factors assigned to neighboring segment sensor values in setting a segment position.

The ASMC system of this invention is markedly different from, and offers significant advantages over the prior art PAMELA optical system of U.S. Pat. No. 4,825,062. In a PAMELA adaptive mirror, the tilt information for each segment is determined by measurements made of optical wavefront tilt with one subaperture of a wavefront sensor. Piston errors are measured with respect to neighboring segments with edge height sensing coils of the inductive type (see U.S. Pat. No. 4,816,759). In contrast to PAMELA and in accordance with the ASMC system of this invention, the piston control is accomplished in a similar fashion to PAMELA, but the segment tilt is measured with respect to neighboring segments in a differential manner. Thus, segment edge height matching produces a quasi-continuous surface, and the addition of the tilt (first spatial derivative of piston) matching produces an accurately shaped surface. Thus, an ASMC segmented mirror is continuous in piston, and adjacent segments have relative tilts which remain constant in time. This is not true for PAMELA, in which case adjacent segments generally have changing relative tilts.

ASMC thus uses local edge sensing for "active" control of piston (normal to the reflecting surface), tip and tilt. It is assumed that the support structure provides sufficient stiffness to maintain the other three degrees of freedom (rotation about an axis normal to the segment and through its center, and translation in two directions in the plane parallel to the reflecting surface) within acceptable bounds to provide the required mirror accuracy.

Figure 5:
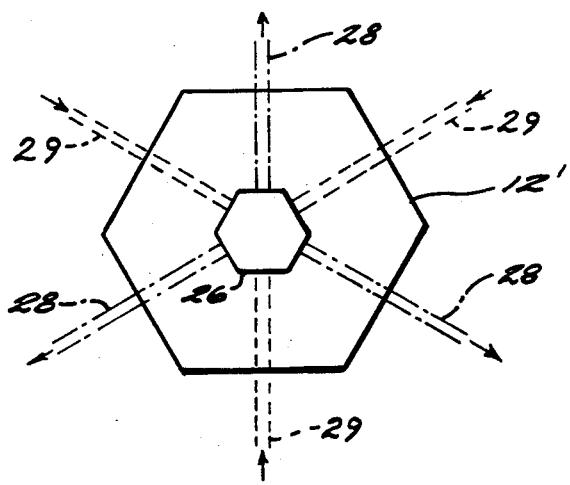
FIG. 5 is a bottom view of a mirror segment depicting an alternate embodiment of the present invention.

In an alternative embodiment of the present invention, ASMC segments have a central sensing unit coupled optically to its neighbors using three active beams and three passive reflecting elements on its six sides. This is an alternate configuration to the edge sensors described in FIG. 2. This alternative embodiment is shown in FIG. 5 where a central sensor unit 26 is mounted on the bottom of a segment 12'. Sensor 26 emits and receives three beams 28 and receives and returns three incoming beams 29 from neighboring segments on alternate facets. Differential height and tilt are measured by comparing the return beam with the outgoing beam 28.

The ASMC system of this invention and the PAMELA system of U.S. Pat. No. 4,825,062 may also be combined in a single segmented mirror. In this latter embodiment, the computer 22 may be used to set segment tilt from wavefront sensor data (in cases where this information is available). This is the adaptive optics control mode (i.e., PAMELA). Alternatively, in the active control mode (i.e., ASMC), tilt settings are based upon the segment-to-segment differential tilt sensors described in conjunction with the present invention.

It will be appreciated that there are still three degrees of freedom of motion of the entire segmented mirror which are indeterminate in the ASMC method of this invention. These three degrees of motion are the average piston position and the global tip and tilt angles.

In a practical system, the tip and tilt angles will be controlled by a separate pointing and tracking system. This pointing system may be based upon physical encoders measuring tilt with respect to the Earth or inertial space on the mounting platform. It is also possible to use the light reflected off the segmented array mirror to determine the pointing error using an optical tracker.

In either an ASMC, a PAMELA, or a combined ASMC/PAMELA system the average piston position of the array will be set by monitoring the available dynamic range of actuators and adjusting the average actuator command so that no actuators reach the physical travel limits.

In order for ASMC to function properly, the mechanical interface between the sensors and the mirror segments must be rigid and stable. That is, the sensors must represent the average mirror surface position. This leads to additional requirements on the segments including: (1) the segments must not appreciably change their shape; and (2) the sensors must be mounted so that they accurately represent the segment mirror surface. For edge mounted sensors, the segment edges cannot move excessively with respect to the center of the segment.

The sensors can be one or more of several types. Examples of two sensing methods will now be described with respect to FIGS. 6 and 8. In the sensing method shown in FIG. 6 (and 7) there are two types of differential position data including (1) edge height mismatch and (2) edge tilt mismatch. These two types of position data are measured on three alternating sides of each hexagonal mirror segment. This data can be measured either with two separate devices or by a single device. The tilt can be measured using a conventional auto collimator or by subtracting two separated displacement sensors. The edge height error can be sensed using the inductive coil method described by Ames et al in U.S. Pat. No. 4,816,759. Thus, no mechanical contact or wiring is needed between adjacent segments.

Figure 6:
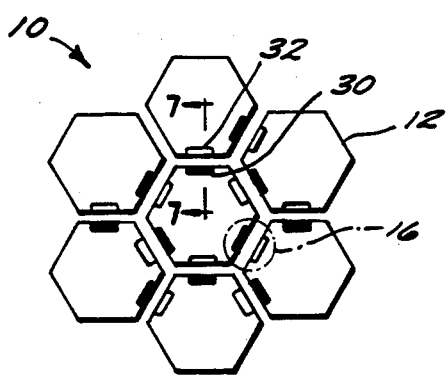
FIG. 6 is a top plan view of an array of mirror segments depicting a first sensor orientation.
Figure 7:
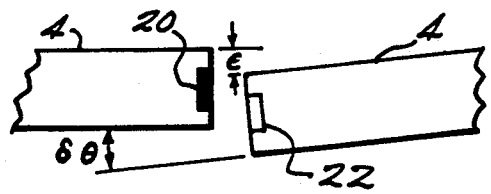
FIG. 7 is a cross-sectional elevation view along the line 7—7 of FIG. 6.

As shown in FIG. 6, sensor 16 is composed of two parts, an active half 30 and a passive half 32. FIG. 7b shows a cross sectional side view of a sensor 16 and indicates the edge height error $\epsilon$ and the edge tilt error $\delta\theta$. Thus, the tilt error is measured in the plane 7—7 shown in FIG. 6, which is orthogonal to the mirror surface and which passes through the centers of each of the pair of segments 12. If each segment is instrumented as shown in FIGS. 6 and 7, then the mirror shape is completely determinate. However, the orientation of the controlled array is, of course, to be controlled by external means as described previously. Any one of the segments can be selected to be the "Master Segment" for pointing and external alignment purposes.

It will be appreciated that edge height only (without tilt) is insufficient to control the mirror shape. Both height and tilt matching are required. It will also be appreciated that six measurements (three edge heights and three tilts) are made in the apparatus of FIG. 6 for each segment, whereas only three independent measurements are required to accomplish full control of the three actuators. Thus, the sensing method of FIG. 6 is redundant by a factor of 6/3=2. This redundancy is desirable from several points of view. First, additional measurements will result in more precise determinations of segment location (i.e., the sensor noise is reduced by averaging independent measurements). Second, sensor failures can be tolerated without loss of control. Third, the sensor arrangement is symmetrical (in a triangular fashion) and all sensors are identical, leading to production economies. The disadvantage of this large redundancy is increased complexity and cost.

Figure 8:
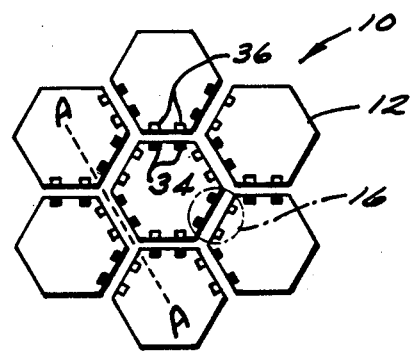
FIG. 8 is a top plan view of an array of mirror segments depicting a second sensor orientation.

A second sensor configuration is shown in FIG. 8. In FIG. 8, each segment 12 has three sets of sensors 16 which are composed of two pairs of active halves (34) and passive halves (36). The two active/passive pairs 34, 36 are identical and are spaced apart by nearly the full length of one edge of the hexagonal segment. It should be noted here that ASMC can be applied to arbitrary segment outline shape, whether it be hexagonal, triangular, square, rectangular or trapezoidal, so long as at least three pairs of points around the periphery are located adjacent to neighboring segments. In the second sensor configuration of FIG. 8, each edge sensor 16 is in fact a pair of identical edge height mismatch sensors. It will be appreciated that the average of the two measurements represents segment piston error along that segment edge. In addition, the difference in the two measurements represents the differential tilt in the plane A—A in FIG. 8 which is perpendicular to the mirror surface but parallel to the segment edge. Recall that in the sensing method of FIG. 6, the tilt is measured in plane 7—7 of FIG. 6 which is perpendicular to the mirror surface and also perpendicular to the segment edge.

A disadvantage of the FIG. 8 method compared to the FIG. 6 method is that the overall mirror curvature is indeterminate in FIG. 8. A careful review of FIG. 8 will reveal that, for example, the outer ring (of six segments in this example) can tilt radially while maintaining all height sensors in matched positions. That is, each of the outer segments can be tilted to the same angle in radial planes through the center of each outer segment and the center of the middle segment. Thus, array curvature is indeterminate. This can be rectified by adding a few additional constraints. For instance, in FIG. 8, one tilt sensor perpendicular to the segment edge in a radial plane would properly constrain the array curvature. In general, one such additional radial tilt sensor is required per ring around the central element. Note that the first sensor configuration does not have this problem because the radial tilt measurements are already included.

In the first sensor configuration, the overall segment mirror surface accuracy is approximately equal to the error in reading a single sensor.

The mirror accuracy is approximately equal to (on the order of) the larger of the height sensor error $\sigma_\epsilon$ or the tilt sensor error $\sigma_{\delta\theta}$ times the segment diameter d. This is true because, as the number of segments N increases, the effect of sensor noise on the RMS surface accuracy along a single measurement path is increased at least by approximately $[\sqrt{N}]^{\frac{1}{2}} = N^{\frac{1}{4}}$ whereas there are more integration paths over which a given segment's position can be determined (each with a different correlation coefficient with respect to the most direct route), thereby reducing the overall mirror figure error due to sensor noise. In general the mirror figure error $\sigma$ will depend on N as $$\sigma^2 \approx [A + B \ln N] \cdot \sigma_\epsilon^2 + [C + D \ln N] \cdot [\sigma_{\delta\theta} \cdot d]^2$$

Numerical simulations show that $A \approx 0.5$, $B \approx 1.2$, $C \approx 3$, and $D \approx 0.8$. Thus, $\sigma^2 \approx$ constant when N is small and $\Sigma^2 \approx \ln N$ for very large N.

In an operational system, the scale factors of the tilt sensors can be calibrated by simply driving the actuators a known distance (or fixed number of steps for step motors) and then reading the change in the sensor readings. This determines the sensor gain scale factor but not its null offset point. This can only be determined (or adjusted) with a special test jig or other meterology device which independently measures the desired parameter. Thus, sensor null stability is a requirement for proper figure control. However, if the null is the desired operating point for the negative feedback position control loops, then neither gain stability nor gain accuracy are required. A rough approximation of the sensor gain scale factor will suffice for good transient response of the servo control system. The sensor null stability allows laboratory calibration of the figure accuracy to be transferred to the field device without recalibration. This is particularly useful for assembling or deploying segmented mirrors under conditions where accurate alignment measurements cannot be made, such as in space. One example is the NASA Large Deployable Reflector.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for controlling a plurality of individual segments to maintain a predetermined structural shape comprising:
   a plurality of individual adjacent segments;
   a plurality of segment positioning means, one each of said segment positioning means being operatively connected with one each of said segments to provide vertical, tip and tilt movement to each of said segments;
   segment edge sensing means operatively connected with each segment for sensing differential positioning information for each segment; and
   computer means for receiving differential positioning signals from said segment edge sensing means and delivering differential control signals to each of said segment positioning means wherein, in response to said differential control signals, said segment positioning means position said segments so that said differential positioning signals are nulled to remove errors and thereby maintain a predetermined structural shape.

2. The apparatus of claim 1 wherein:
   said computer means comprises a plurality of processor means, one each of said processor means being operatively connected with a respective one of said segments.

3. The apparatus of claim 2 wherein:
   each of said processor means delivers control signals only to the respective segment with which said processor means is operatively connected wherein errors in structural shape are reduced iteratively.

4. The apparatus of claim 3 wherein each of said processor means delivers control signals to said segment positioning means in accordance with the equation:

$$A = M(S - S_o)$$

where
   A is a 1×3 column vector of said differential control signals;
   M is a 3×3 conversion matrix;
   S is a 1×3 column vector of said differential positioning signals; and
   $S_o$ is a 1×3 column vector of differential positioning signals to maintain the predetermined structural shape.

5. The apparatus of claim 1 wherein:
   said computer means delivers control signals to a plurality of said segment positioning means in parallel wherein errors in structural shape are reduced iteratively.

6. The apparatus of claim 5 wherein said plurality of individual adjacent segments comprise a preselected total number of segments and wherein said computer means delivers control signals to said segment positioning means in accordance with the equation:

$$A = M(S - S_o)$$

where
   A is a 1×3N column vector of differential control signals;
   M is a 3N×3N conversion matrix;
   S is a 1×3N column vector of differential positioning signals;
   $S_o$ is a 1×3N column vector of differential positioning signals to maintain the predetermined structural shape; and
   N is the preselected total number of segments.

7. The apparatus of claim 2 wherein;
   each of said processor means receives differential positioning signals from the respective segment with which said processor means is operatively connected and from the segments which are adjacent to said respective segment; and wherein
   each of said processor means delivers control signals to said respective segment, said control signals incorporating differential positioning signals from said segments which are adjacent to said respective segment wherein errors in structural shape are iteratively reduced.

8. The apparatus of claim 7 wherein each respective segment has a preselected number of segments adjacent thereto and wherein each of said processor means delivers control signals to said segment positioning means in accordance with the equation:

$$A = M(S - S_o)$$

where
   A is a 1×3 column vector of said differential control signals;
   M is a 3×3 (J+1) conversion matrix;
   S is a 1×3 (J+1) column vector of differential positioning signals;
   $S_o$ is a 1×3 (J+1) column vector of differential positioning signals to maintain the predetermined structural shape; and
   J is the preselected number of segments adjacent to said respective segment.

9. The apparatus of claim 8 wherein:
   each of said segments has a hexagonal shape and wherein J is equal to six.

10. The apparatus of claim 1 wherein each of said segment positioning means comprises:
   a plurality of piston actuators attached to each of said segments.

11. The apparatus of claim 10 including three piston actuators equispaced on each of said segments.

12. The apparatus of claim 1 wherein said segment edge sensing means comprises:
   a plurality of pairs of opposed sensors, one of said sensors being positioned on a first segment and the other of said sensors being positioned on a second segment adjacent said first segment.

13. The apparatus of claim 12 wherein:
   one of said sensors in said pairs of sensors comprise an active sensor and the other of said sensors in said pair of sensors comprises a passive sensor.

14. The apparatus of claim 1 wherein:
   each of said segment edge sensing means on each of said segments is optically coupled to adjacent segment edge sensing means.

15. The apparatus of claim 1 wherein said differential positioning information includes:

edge height mismatch and
edge tilt mismatch.

16. The apparatus of claim 15 wherein each of said segments has a primary surface bounded by edges and wherein said edge tilt mismatch is measured in a plane which is orthogonal to said primary surface and orthogonal to said edges.

17. The apparatus of claim 15 wherein:
each of said segments has a primary surface bounded by edges wherein said edge tilt mismatch is measured in a plane which is orthogonal to said primary surface and parallel to said edges.

18. The apparatus of claim 1 wherein:
each of said segments has six side surfaces.

19. The apparatus of claim 18 wherein said segment edge sensing means comprises:
a plurality of sensors, one each of said sensors being positioned on one each of said six sides.

* * * * *